United States Patent
Lin et al.

(10) Patent No.: US 9,114,561 B2
(45) Date of Patent: Aug. 25, 2015

(54) MANUFACTURING METHOD FOR CONTAINER WITH ARTIFICIAL CREATURES

(71) Applicant: JJ Rabbit LLC, Austin, TX (US)

(72) Inventors: Karen Lin, Austin, TX (US); Cheng-Tsung Lin, Keelung (TW)

(73) Assignee: JJ RABBIT LLC, Austin, TX (US)

( * ) Notice: Subject to any disclaimer, the term of this patent is extended or adjusted under 35 U.S.C. 154(b) by 97 days.

(21) Appl. No.: 14/012,740

(22) Filed: Aug. 28, 2013

(65) Prior Publication Data

US 2015/0061185 A1    Mar. 5, 2015

(51) Int. Cl.
*B29C 45/14* (2006.01)
*B29C 45/16* (2006.01)

(52) U.S. Cl.
CPC ..... *B29C 45/14467* (2013.01); *B29C 45/14065* (2013.01); *B29C 45/14336* (2013.01); *B29C 45/16* (2013.01); *B29C 2045/14131* (2013.01); *B29C 2045/14524* (2013.01)

(58) Field of Classification Search
None
See application file for complete search history.

(56) References Cited

U.S. PATENT DOCUMENTS

| | | | |
|---|---|---|---|
| 5,753,151 A * | 5/1998 | McBride | 264/1.9 |
| 6,174,482 B1 * | 1/2001 | Reames et al. | 264/250 |
| 6,773,652 B2 * | 8/2004 | Loy et al. | 264/274 |
| 8,178,024 B2 * | 5/2012 | Odashima et al. | 264/275 |
| 2010/0314797 A1 * | 12/2010 | Odashima et al. | 264/278 |

* cited by examiner

*Primary Examiner* — Edmund Lee
(74) *Attorney, Agent, or Firm* — Guice Patents PLLC

(57) ABSTRACT

A manufacturing method for container having an opening and a bottom on which an artificial creature is disposed includes the following steps: (a) forming an artificial creature integrated with a base by plastic injection molding; (b) providing a injection mold comprising a male mold and a female mold comprising a cavity corresponding to the artificial creature; (c) positioning the artificial creature and the base to the male mold; and (d) matching the male mold and female mold to form paths between the male mold and female mold and between the base and the female mold to allow molten plastic flow therethrough so as to form the container in such a manner that the bottom of the container encloses the base so as to position the artificial animal on the bottom of the container.

5 Claims, 7 Drawing Sheets

MANUFACTURING METHOD FOR CONTAINER WITH ARTIFICIAL CREATURES

BACKGROUND OF THE INVENTION

1. Field of the Invention

The present invention relates to manufacturing method for a container with an artificial creature and more particularly, to a manufacturing method for a container with an artificial creature utilizing plastic injection molding.

2. Description of the Related Art

A container, such as a cup, especially a cup for children, may have artificial animals such as a frog, penguin or rabbit on its bottom to provide interest for children. When children hold the cups, the artificial animals may attract them and inspire them to drink.

Since the artificial animals must be installed in the container (the cup), particularly on the bottom of the container, and the artificial animals having various types and profiles must be spaced from the inner wall of the cups, the container is difficult to be fabricated by plastic injection molding. Typically, the container is made of ceramics and fabricated by clay shaping.

However, the fabrication process for ceramics products has low manufacturing rate and high cost, which is conducive to mass production and promotion of the container including artificial animals.

SUMMARY OF THE INVENTION

It is one object of the present invention to provide a manufacturing method for a container with an artificial creature, wherein the container with artificial animals is mass produced by plastic injection molding, and the manufacture cost is thus reduced.

To achieve this object of the present invention, one embodiment of the manufacturing method for a container with an artificial creature of the invention including the following steps:

forming an artificial creature integrated with a base by plastic injection molding; providing a injection mold comprising a male mold and a female mold comprising a cavity corresponding to the artificial creature; positioning the artificial creature and the base to the male mold; and matching the male mold and female mold to form paths between the male mold and female mold and between the base and the female mold to allow molten plastic flow therethrough so as to form the container in such a manner that the bottom of the container encloses the base so as to position the artificial animal on the bottom of the container.

In one embodiment of the present invention, the base includes positioning posts to position the artificial creature and the base in a predetermined direction.

In one embodiment of the present invention, the base includes a first stop portion abutting the bottom of the container to prevent the base from moving inward, and a second stop portion abutting the bottom of the container to prevent the base from moving outward.

The first stop portion includes a first inner conical portion, and the second stop portion includes a first outer conical portion; the bottom of the container includes a second inner conical portion corresponding to the first inner conical portion, and a second outer conical portion corresponding to the first outer conical portion.

In one embodiment of the present invention, a hollow portion is formed in the artificial creature and the base in such a manner that the hollow portion extends from the base into the artificial creature, whereby plastic material for forming the artificial animal and the base is saved.

DETAILED DESCRIPTION OF THE PREFERRED EMBODIMENT

Figure 1:
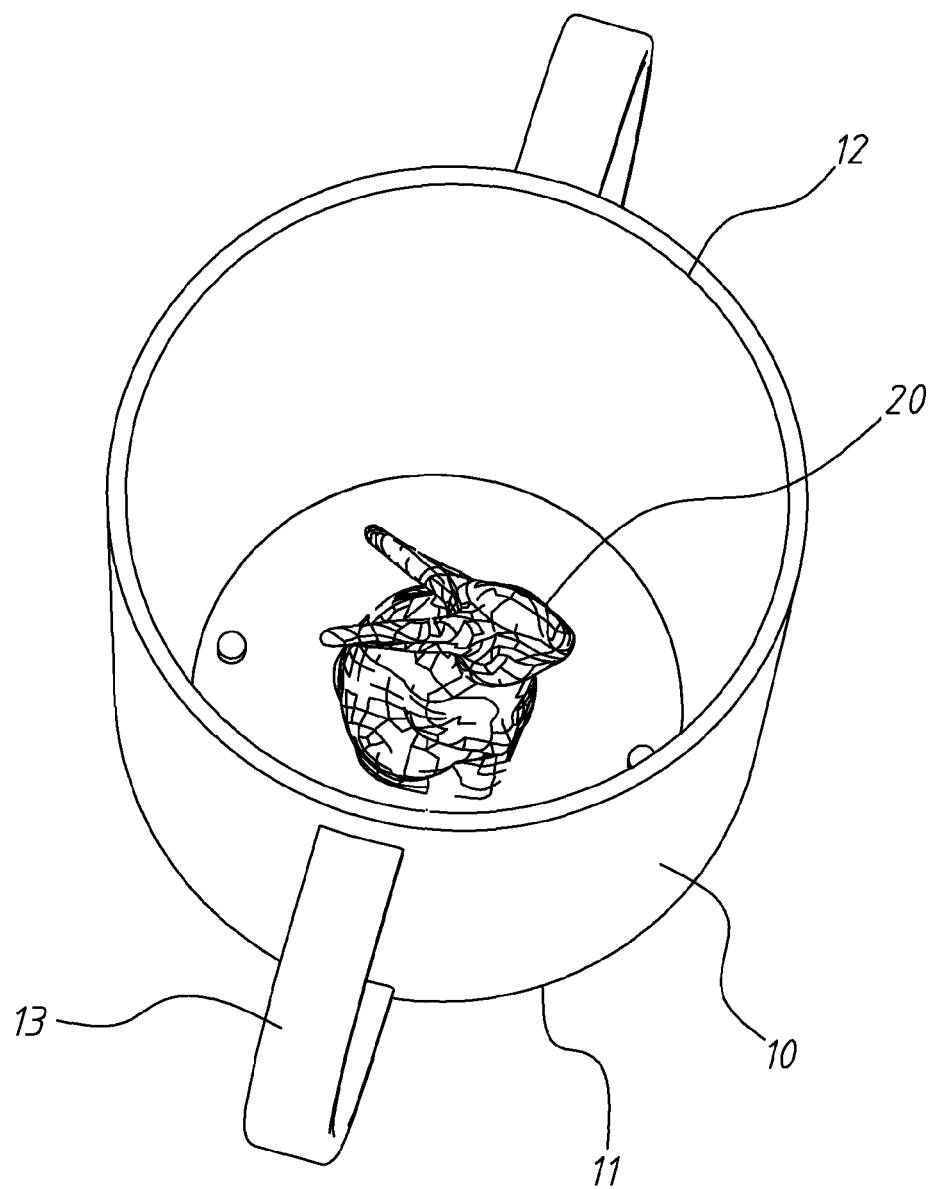
FIG. 1 depicts a container with an artificial creature manufactured by plastic injection molding of the present invention.

The invention is detailed described by the following embodiment in accompany with drawings, Referring to FIG. 1, a container 10 includes a bottom 11 and an opening 12. By tightly sealing the bottom 11, various liquid or substances can be purred into the container 10 via the opening 12. Although the container 10 in this embodiment is a cup, it is not limited thereto. Other containers having a sealed bottom and an opening are also applicable.

An artificial creature 20 is installed on the bottom 11 of the container 10. Although the artificial creature 20 in this embodiment is a rabbit, other creatures such as frog or penguin is also applicable. A grip 13 is disposed on an outer periphery of the container 10 to facilitate grip of the container 10.

Figure 2:
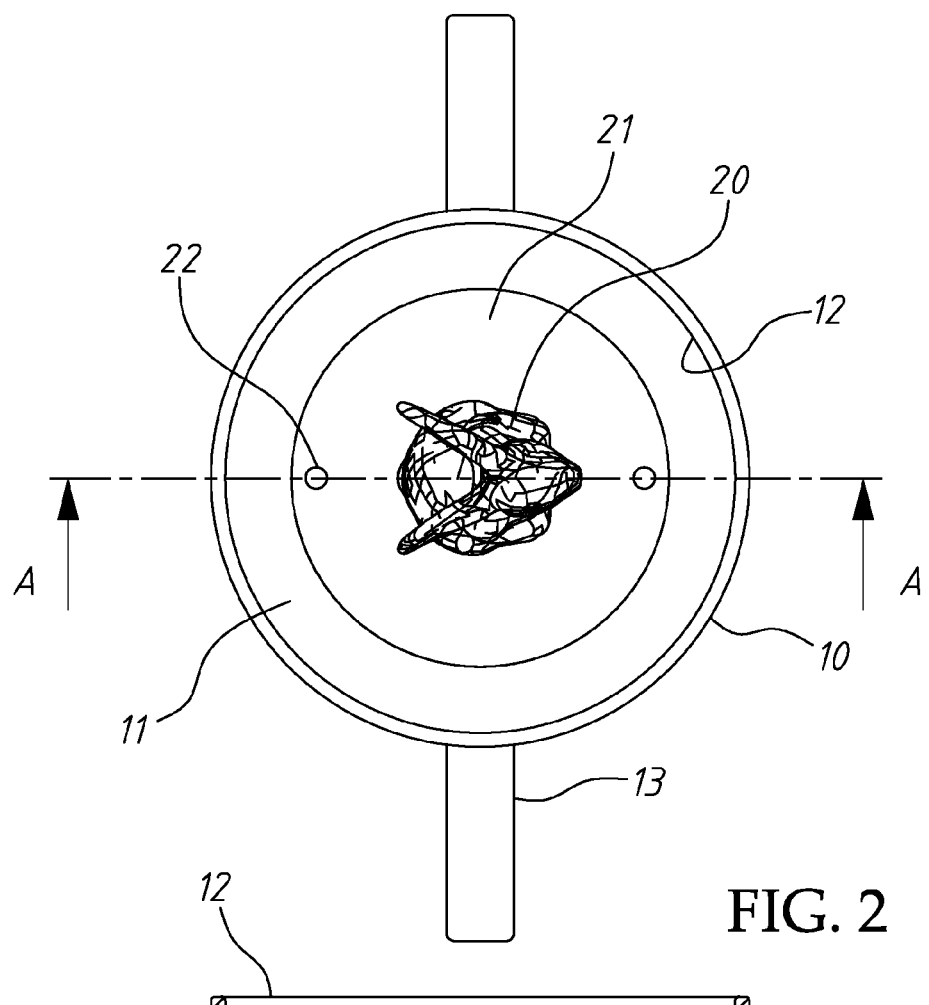
FIG. 2 is a top view of FIG. 1.
Figure 3:
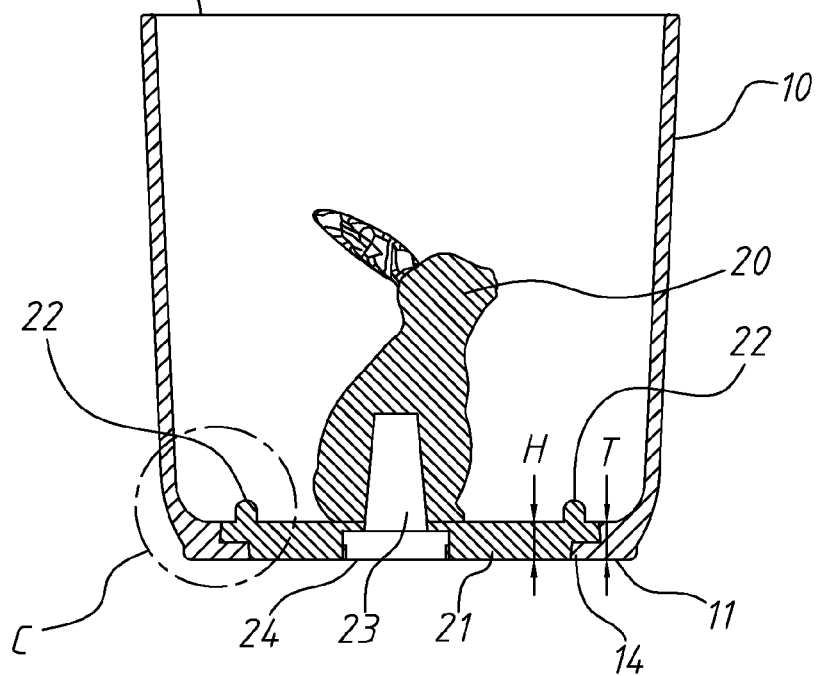
FIG. 3 is a cross section of FIG. 2 in the A-A direction.

Referring to FIGS. 2 and 3, the artificial creature 20 is installed on an upper surface of a base 21. The vertical height H of the base 21 is designed to be adapted to the thickness T of the bottom 11 of the container 10.

Figure 5:
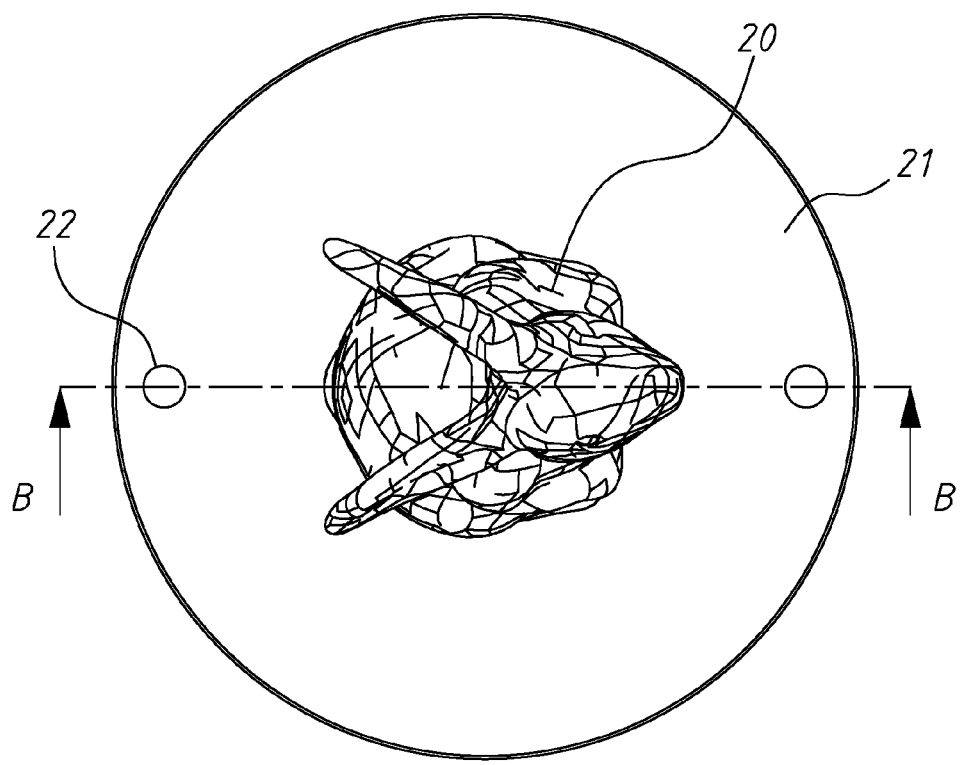
FIG. 5 is a top view of an embodiment of an artificial creature of the invention.
Figure 6:
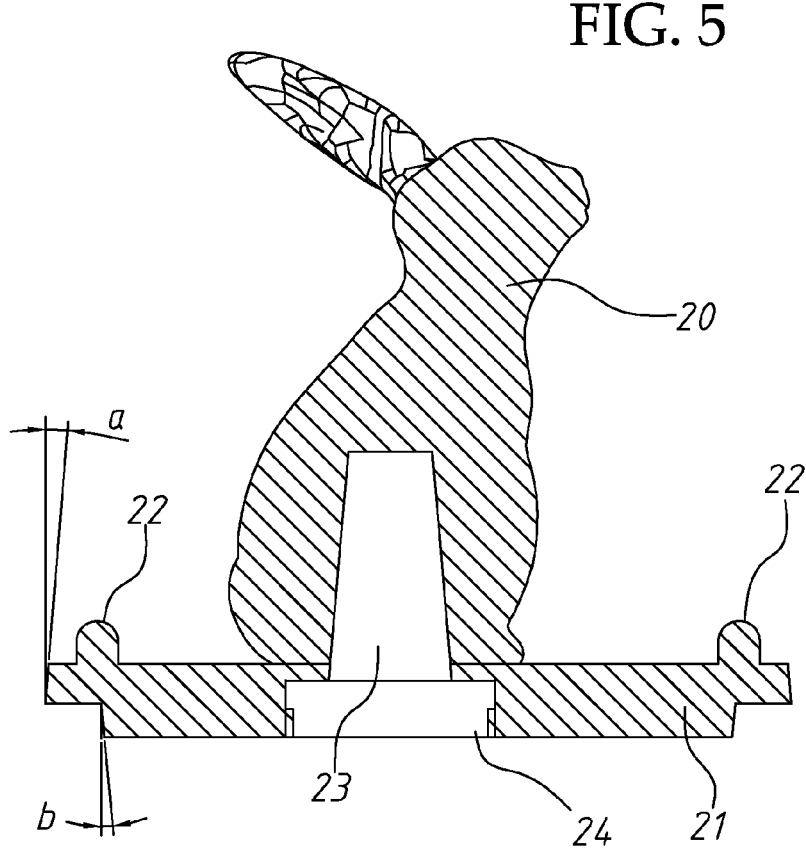
FIG. 6 is a cross section of FIG. 5 in the B-B direction.

Referring to FIGS. 5 and 6, the artificial creature 20 is integrated with the base 21 by plastic injection molding. The integrated artificial creature 20 and the base 21 are assembled to the bottom 11 of the container 10 in a manner that the artificial creature 20 is received in the container 10 to be integrated together.

Figure 4:
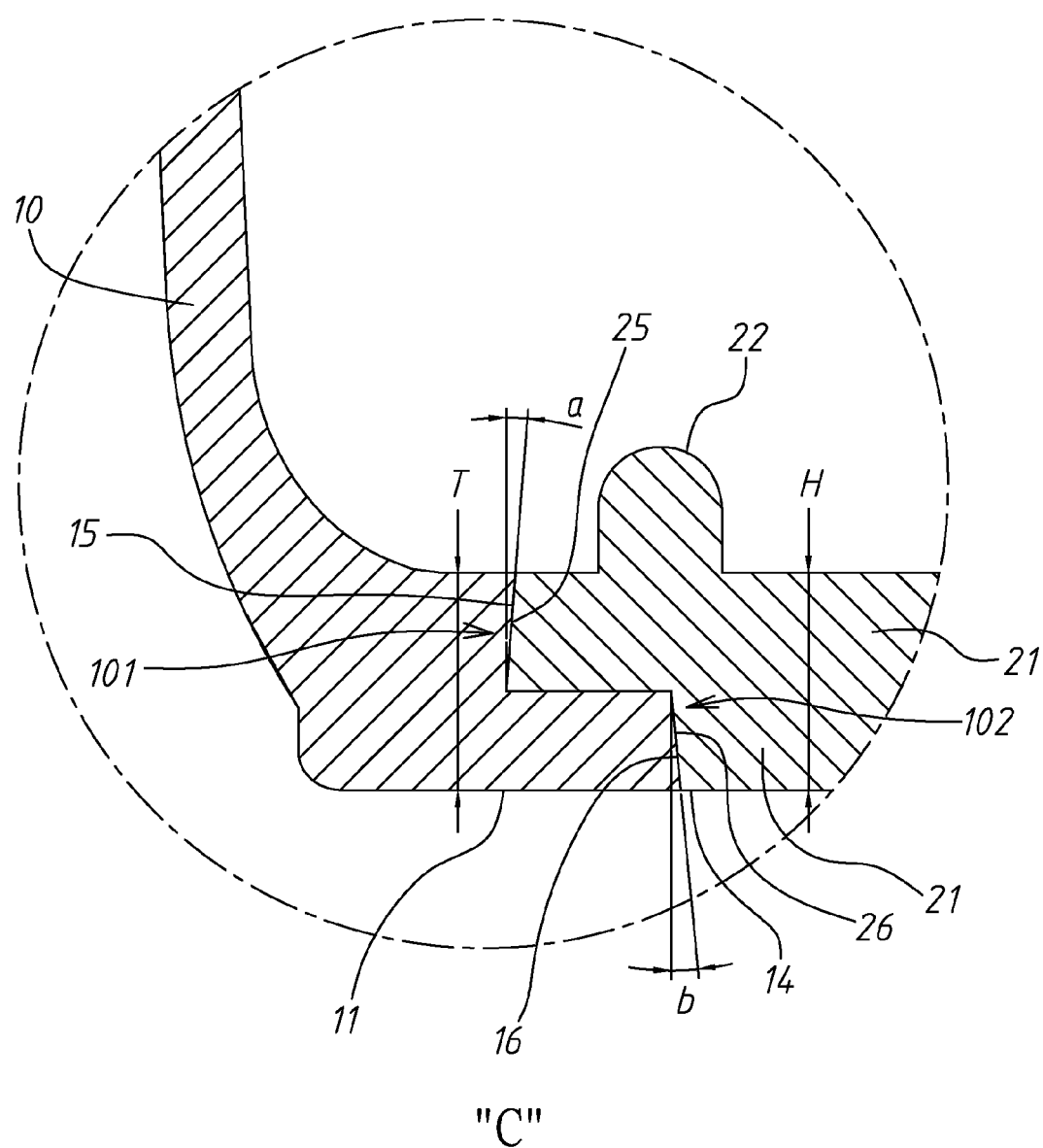
FIG. 4 is an enlarged view of C portion of FIG. 3.

Referring to FIGS. 2 to 4, a hole 14 (shown in FIGS. 3 and 4) having a size corresponding to the base 21 is formed on the bottom 11 of the container 10 to receive the base 21. Therefore, the base 21 with the artificial creature 20 is assembled to the bottom 11 of the container 10.

To enhance the strength of the assembly structure, the base 21 is a double layer structure and has a first stop portion 101 and a second stop portion 102 (shown in FIG. 4) formed in a position where the base 21 abuts the bottom 11. In this embodiment, the first stop portion 101 has a first inner conical portion 25 and the second stop portion 102 has a first outer conical portion 26. The bottom 11 of the container 10 has a second inner conical portion 15 and a second outer conical portion 16 formed on the wall of the hole 14. When the base 21 is assembled to the bottom 11 of the container 10, the first inner conical portion 25 and the second inner conical portion 15 are joined by an angle a, and the first outer conical portion 26 and the second outer conical portion 16 are joined by an angle b. The assembly structure enhances the entire strength and avoids the base 21 to fall off from the bottom 11 of the container 10 inward or outward by means of the opposite conical portions formed on the base 21 and the bottom 11 respectively.

In addition, positioning posts 22 are disposed on the base 21 to position the artificial creature 20 in a predetermined direction during the manufacturing process (for example, the heads of all artificial creatures 20 extend toward a predetermined direction) in this embodiment.

Figure 7:
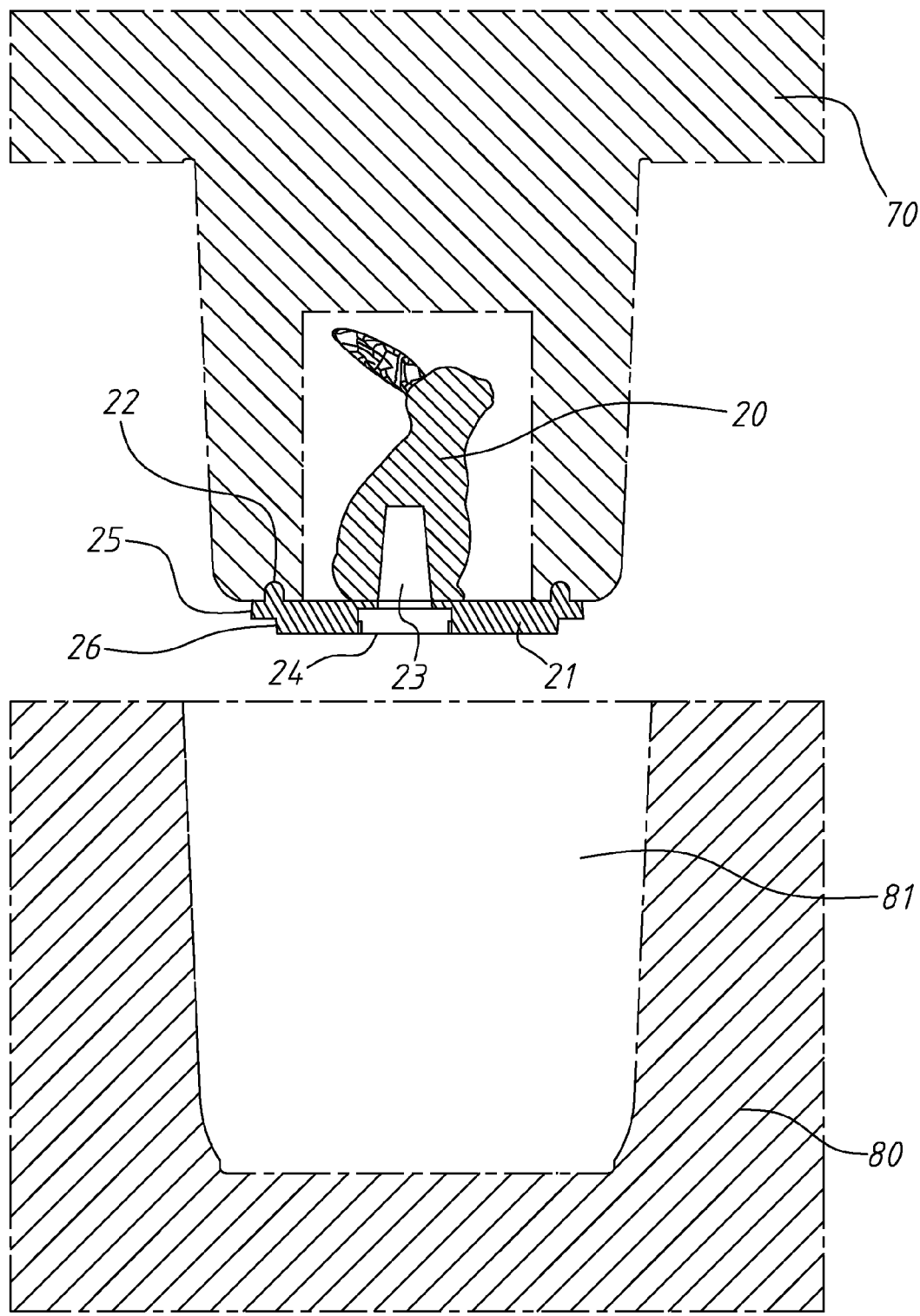
FIG. 7 depicts the male mold along with the artificial creature ready to match with the female mold of the present invention.

Referring to FIG. 7, an injection mold including a male mold 70 and a female mold 80 is applied to plastic injection molding of the manufacturing process of the invention. A cavity 81 of predetermined size is formed in the female mold 80. The cavity 81 can have a larger size to form artificial creatures of various sizes. The artificial creature 20 along with the base 21 is placed in the male mold 70, and the positioning posts 22 are inserted into mold holes formed on the male mold 70 to position the artificial creature 20 in a predetermined direction during the manufacturing process.

Figure 8:
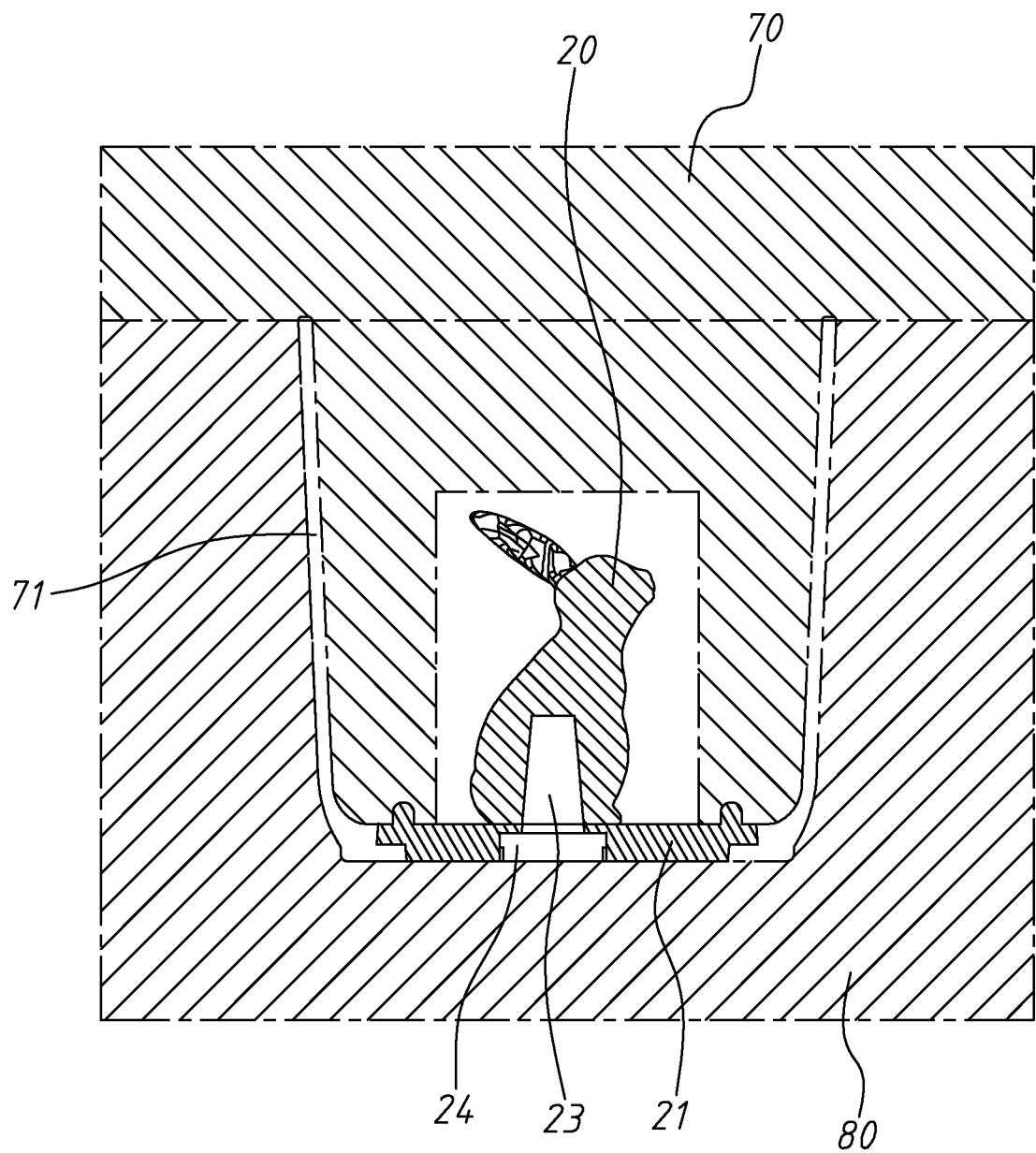
FIG. 8 depicts the male mold matched with the female mold of the present invention.
Figure 9:
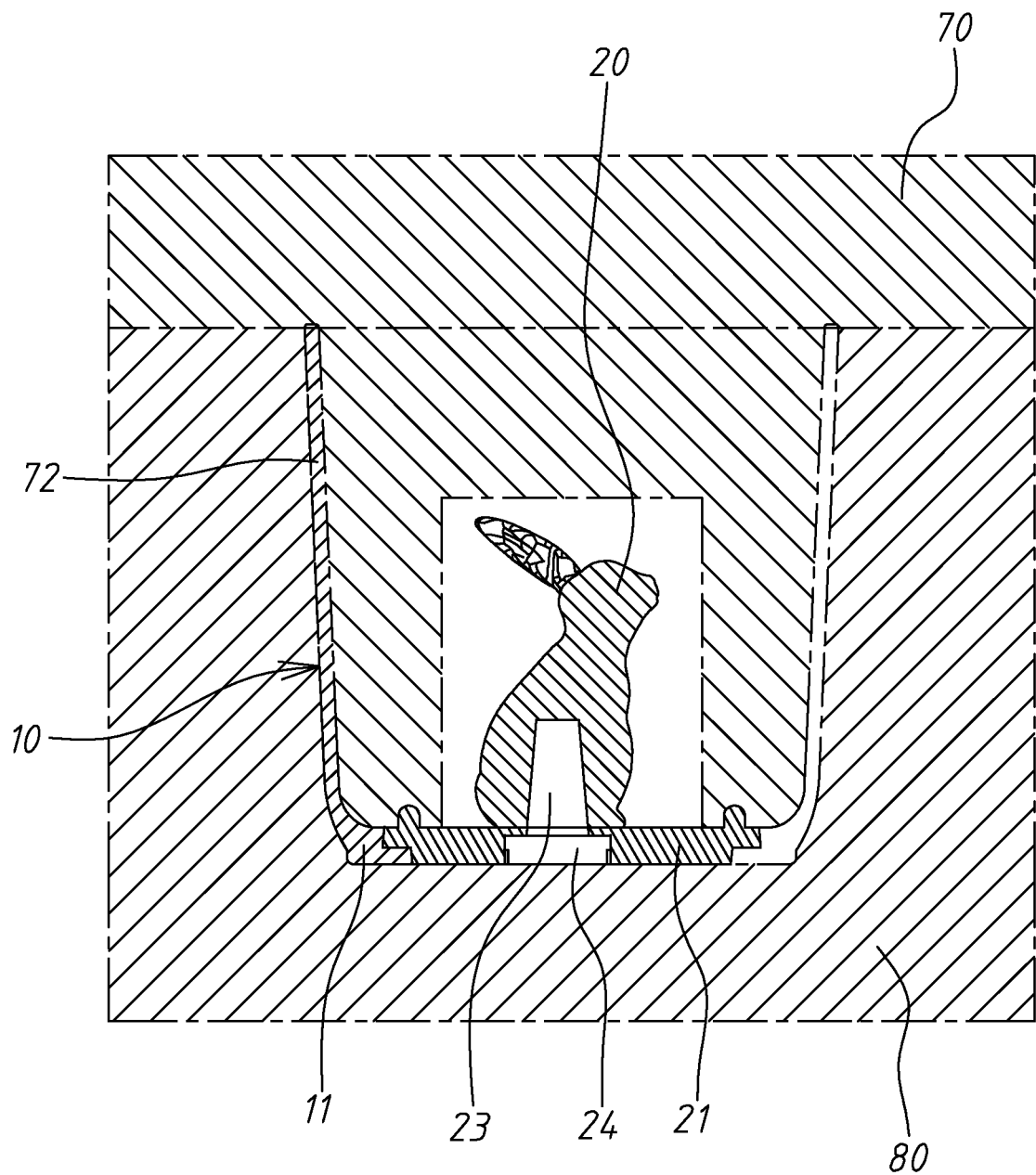
FIG. 9 depicts the molten plastic purred into the paths between the male mold and the female mold and between the base and the female mold of the present invention.

Referring to FIG. 8, the male mold 70 matches the female mold 80 to form paths 71 between the male mold 70 and female mold 80 and between the base 21 and the female mold 80 to allow molten plastic 72 flow and be injected into the mold so as to form the container 10 which has the bottom 11 enclosing the base 21. In addition to a main body of the container 10, the molten plastic 72 also forms the bottom 11 of the container 10, which has the second inner conical portion 15 and the second outer conical portion 16 to join the first inner conical portion 25 and the first outer conical portion 26 as described above.

Since the container 10 is used for children, the material of the container 10, the artificial creature 20 and the base 21 is preferably poly lactic acid or other Eco-friendly material.

A hollow portion 23 can be formed in the artificial creature 20 and the base 21 and extend a predetermined depth from the bottom surface 24 of the base 21 to the artificial creature 20 (shown in FIGS. 6 to 9). A cover (not shown) is attached to the bottom surface 24. The hollow portion 23 can reduce the plastic material used in the plastic injection molding and can also prevent the depression or sink mark occurred in the injection process due to shrinkage of the solidifying plastic material.

Since the plastic injection molding is applied to the manufacturing method for a container of the invention, the manufacturing method of the invention is particularly suitable for mass production by plastic injection machine which raise the fabrication rate and thus reduce the cost.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A manufacturing method for a container comprising an opening and a bottom on which an artificial creature is disposed, comprising:
    (a) forming an artificial creature integrated with a base by plastic injection molding;
    (b) providing a injection mold comprising a male mold and a female mold comprising a cavity corresponding to the artificial creature;
    (c) positioning the artificial creature and the base to the male mold; and
    (d) matching the male mold and female mold to form paths between the male mold and female mold and between the base and the female mold to allow molten plastic flow therethrough so as to form the container in such a manner that the bottom of the container encloses the base so as to fix the artificial animal on the bottom of the container.

2. The manufacturing method as claimed in claim 1, wherein the base comprises positioning posts to position the artificial creature and the base in a predetermined direction relative to the injection mold.

3. The manufacturing method as claimed in claim 1, wherein the base comprises a first stop portion abutting the bottom of the container to prevent the base from moving inward, and a second stop portion abutting the bottom of the container to prevent the base from moving outward.

4. The manufacturing method as claimed in claim 3, wherein the first stop portion comprises a first inner conical portion, and the second stop portion comprises a first outer conical portion; the bottom of the container comprises a second inner conical portion corresponding to the first inner conical portion, and a second outer conical portion corresponding to the first outer conical portion.

5. The manufacturing method as claimed in claim 1, wherein a hollow portion is formed in the artificial creature and the base in such a manner that the hollow portion extends from the base into the artificial creature.

* * * * *